United States Patent [19]

Marcus et al.

[11] Patent Number: 5,643,087
[45] Date of Patent: Jul. 1, 1997

[54] INPUT DEVICE INCLUDING DIGITAL FORCE FEEDBACK APPARATUS

[75] Inventors: Beth A. Marcus, Lexington; Elaine Chen, Boston; Bin An; Timothy Osborne, both of Arlington, all of Mass.

[73] Assignee: Microsoft Corporation, Redmond, Wash.

[21] Appl. No.: 283,065

[22] Filed: Jul. 29, 1994

Related U.S. Application Data

[63] Continuation-in-part of Ser. No. 245,957, May 19, 1994.
[51] Int. Cl.$^6$ .................................................. A63F 9/24
[52] U.S. Cl. ............................................ 463/38; 273/148 B
[58] Field of Search ........................ 434/45; 244/223; 273/438, 434, 148 B, 85 G; 463/36–39; 345/161, 167, 157, 156, 184; 74/471 Y

[56] References Cited

U.S. PATENT DOCUMENTS

| | | |
|---|---|---|
| 3,220,121 | 11/1965 | Cutler . |
| 3,517,446 | 6/1970 | Corlyon et al. . |
| 3,903,614 | 9/1975 | Diamond et al. ........................ 434/45 |
| 4,236,325 | 12/1980 | Hall et al. ................................. 434/45 |
| 4,398,889 | 8/1983 | Lam et al. . |
| 4,513,235 | 4/1985 | Acklam et al. ..................... 244/223 X |
| 4,599,070 | 7/1986 | Hladky et al. . |
| 4,604,016 | 8/1986 | Joyce ................................. 74/471 XY |
| 4,708,656 | 11/1987 | de Vries et al. . |
| 4,713,007 | 12/1987 | Alban ...................................... 424/45 |
| 4,795,296 | 1/1989 | Jau ...................................... 244/223 X |
| 5,044,956 | 9/1991 | Behensky et al. . |
| 5,116,180 | 5/1992 | Fung et al. ......................... 74/471 XY |
| 5,142,931 | 9/1992 | Menahem ........................... 74/471 XY |
| 5,184,319 | 2/1993 | Kramer . |
| 5,209,661 | 5/1993 | Hildreth et al. ........................ 434/45 |
| 5,223,776 | 6/1993 | Radke et al. ...................... 74/471 XY |
| 5,271,290 | 12/1993 | Fischer ............................... 74/471 XY |

OTHER PUBLICATIONS

"Game Pro" magazaine, pp. 1, 146 and 161 (Aug. 1994).

*Primary Examiner*—Jessica Harrison
*Assistant Examiner*—Michael O'Neill
*Attorney, Agent, or Firm*—Ronald M. Anderson

[57] ABSTRACT

An input device for an interactive computer simulation or game is disclosed which includes a structure having at least two degrees-of-freedom which is moveable by a digit of a user to transmit input signal to a computer. At least one actuator connected to the moveable structure receives inputs from a computer and applies forces in the at least two degrees-of-freedom to the movable structure and thereby to the digit of the user. The actuator may include an electric motor and any of a variety of force transmission schemes including direct, cable, gear or belt drives. The applied forces are typically based on internal programming within the computer, events occurring in the simulation and movements of and forces applied to the movable structure by the operator. The input device of the invention thereby provides continuous interaction among motion of and forces applied by the movable structure, the events in the simulation and forces applied to and applied by the movable structure to enhance user enjoyment and performance.

14 Claims, 8 Drawing Sheets

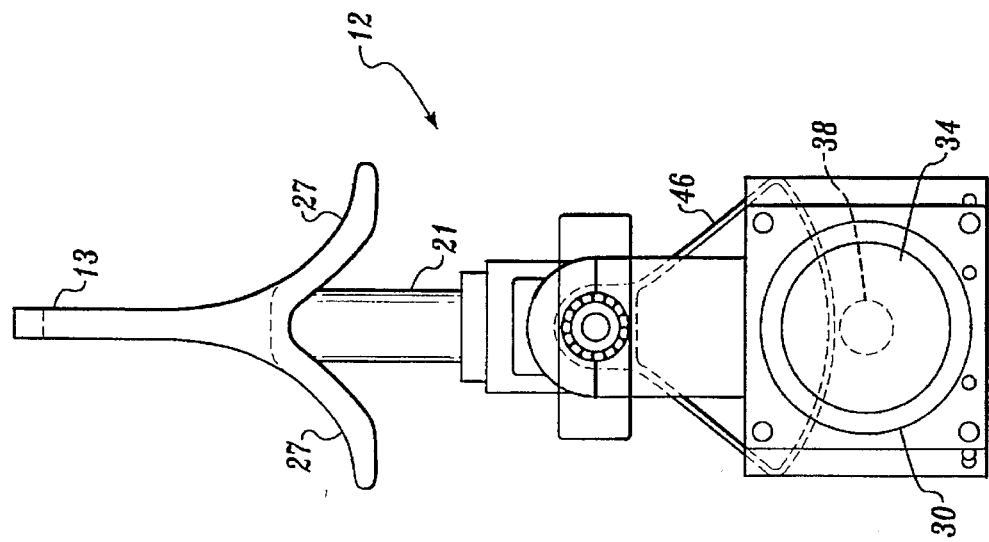
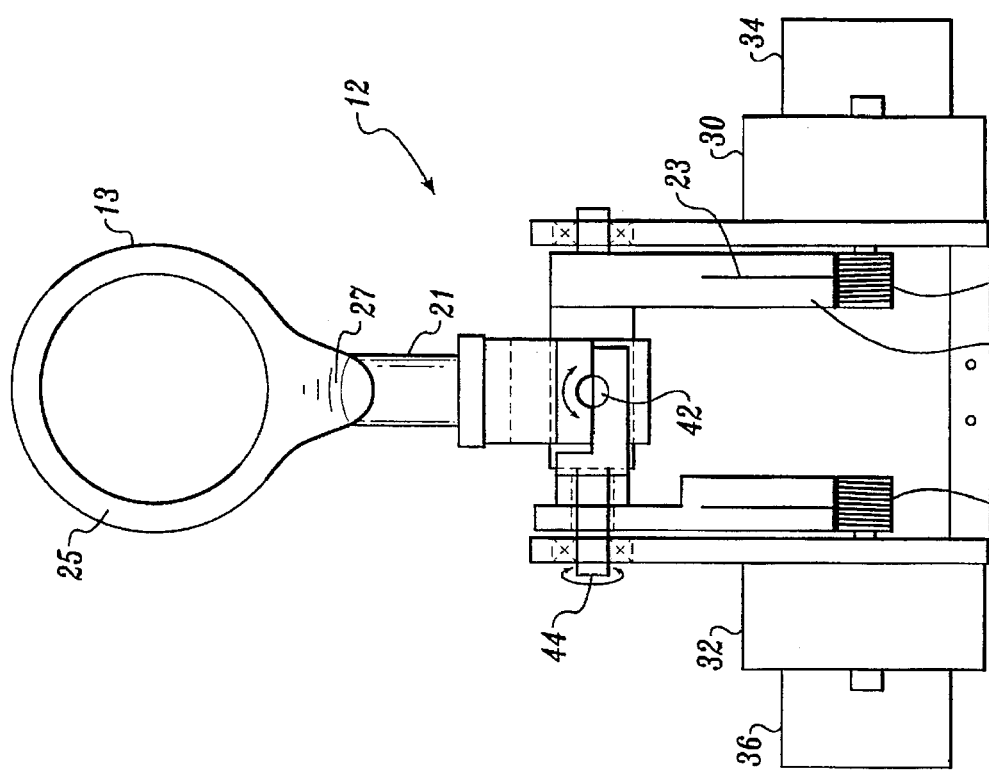

INPUT DEVICE INCLUDING DIGITAL FORCE FEEDBACK APPARATUS

This application is a continuation-in-part application of co-pending application Ser. No. 08/245,957, entitled Interactive Stimulation Including Force Feedback, filed May 19, 1994 still pending and assigned to the same assignee as the present invention, the disclosure of which is herein incorporated by reference.

BACKGROUND OF THE INVENTION

This invention relates to input devices utilized in interactive computer simulations, and more particularly to an input device including force or touch feedback for simulations and games.

Interactive computer simulations and interactive video games typically include functionally limited, dedicated input devices to support interface with a user or player. One type of device used to provide inputs for the simulation or game is a movable structure having two or more degrees-of-freedom of motion, generally known as a joystick. Alternatively, the input device may be a handheld pad having a plurality of switches located thereon in a pattern which affords ease of actuation by one or more digits of a user or operator. Conventionally, the joystick and pad are strictly input devices by which signals are conveyed to the processing unit of the computer. These joysticks and pads do not provide tactile or force feedback to the user which is related in any manner to the simulation or game.

It has been recognized that providing a user tactile or force feedback may afford a more beneficial interface resulting in improved user performance in completing a task. The Atari Hard Drivin® video game provides one-dimensional force feedback to a steering wheel or a brake pedal. That is, during a game, torques are generated on the steering wheel which simulate those torques which would be experienced during, for example, cornering in a car. See also, U.S. Pat. No. 5,044,956. In a more general simulation context, control elements including force feedback are known in elaborate flight simulators costing many millions of dollars. Heretofore, there has been no multiple-degree-of-freedom input device having force feedback suitable for games and simulations and suitable for arcade and home use.

SUMMARY OF THE INVENTION

An input device including digital force feedback apparatus is disclosed for use as an input device with an interactive computer simulation or interactive video game, for example, and comprises a housing or pad suitably configured for grasping in at least one hand of a user. Attached thereto are one or more devices for providing user input including at least one moveable structure having two or more degrees-of-freedom of motion. The moveable structure is configured to accept a digit of a user to control the motion thereof. Actuation means disposed in the housing are connected to the moveable structure to provide force and touch feedback to the digit of the user.

In a preferred embodiment, the movable structure is a digit cradle with up to three passive degrees-of-freedom disposed on a shaft with two actuated degrees-of-freedom. The actuation means include electric motors driving a low-friction, low-backlash transmission of the type comprised of mechanical linkages. Alternate transmission designs are also contemplated, including direct, cable, belt and gear drives. The input device may also include switches or other elements for providing additional user input.

The instant invention may be advantageously utilized in conjunction with an interactive simulation system which includes a computer or game display unit programmed with simulation rules. A control unit connected to the computer provides information and control signals to the computer from the input device which interact with the stored simulation rules and receives information and control signals from the computer. A programmable unit processes signals and information from the computer to generate signals to drive the actuators so as to apply forces in the at least two degrees-of-freedom to the movable structure and thereby to the digit of the operator. The applied forces are based on internal programming within the programmable unit, events occurring in the simulation and movements of and forces applied to the movable structure by the digit of the operator. A system employing the input device of the instant invention thereby provides continuous interaction among motion of and forces applied by the movable structure, the events in the simulation and forces applied to and applied by the movable structure.

By providing touch or force feedback, the system of the invention more effectively involves the operator in the simulation or game. For example, in two-dimensional games such as flight simulators the present digital force feedback apparatus allows a player to feel a difference in performance between a small general aviation airplane and a high performance military fighter and to feel environmental forces such as air turbulence or updrafts. In this case the input device, known as a PowerPad™, will cause the user to feel a variety of programmable resistance effects upon digital movement of the cradle, including feeling "stiffness" or "softness" depending on which type of airplane is being "flown" by the simulation user. In three-dimensional games (which are just now becoming available) force feedback is particularly valuable because navigating in a three-dimensional environment is often difficult and the digital feedback provided by the invention will enable the user to feel objects which are being encountered and provide a real-time indication of where an object controlled by the user or player is located within the simulation or game. In games involving contact, such as fighting games, the invention simulates and displays to the operator's digit the feel of collisions with objects encountered during the game or simulation and interaction with terrains of different textures. It is contemplated that the use of a player's digit for both user input and force feedback may increase a player's performance and satisfaction due to the sensitivity of the digit in responding to force feedback. Further, devices according to the teachings of the instant invention may consume less power, require less volume and weigh less than force feedback devices employed in combination with large joysticks configured to be grasped by a user's entire hand which require greater actuation forces.

BRIEF DESCRIPTION OF THE DRAWINGS

FIGS. 3 and 4 are front and side cross-sectional schematic views, respectively, of an exemplary embodiment of the force feedback apparatus of the present invention.

MODE(S) FOR CARRYING OUT THE INVENTION

Figure 1:
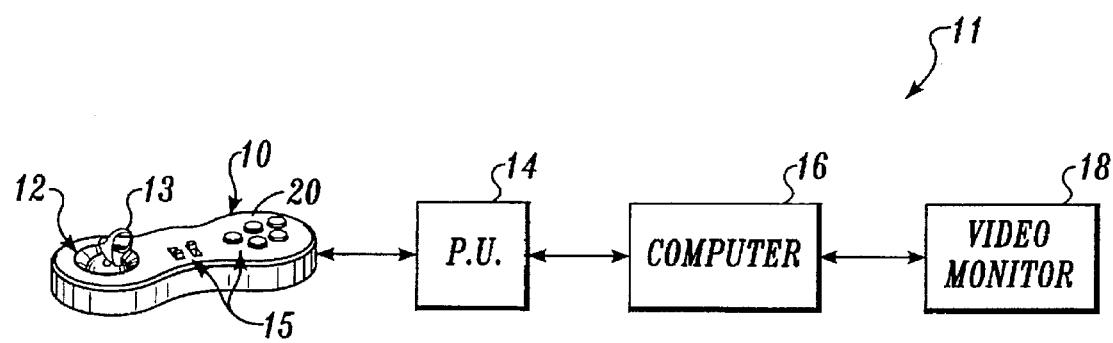
FIG. 1 is a block diagram illustrating a computer system with which the input device of the present invention is advantageously utilized.

FIG. 1 is a block diagram illustrating an input device 10 according to the present invention advantageously utilized in a computer system 11. The input device 10 has a moveable structure 12 including a digit cradle 13 and may include other conventional input switches, for example, those shown generally at 15. The input device 10 communicates with a programmable section or unit 14 which may be physically located within the input device 10 or externally therefrom. A general purpose digital computer 16, such as a personal computer or game display unit, is programmed with simulation or game rules. The output from the computer 16 is displayed on a video monitor 18. The input device 10 is connected to the computer 16, providing information and control signals to the computer 16 to interact with stored simulation rules and receiving information and control signals from the computer 16. The programmable unit 14 processes signals and information from the computer 16 and generates inputs to moveable structure 12, and processes outputs from the moveable structure 12 and switches 15.

Figure 2A:
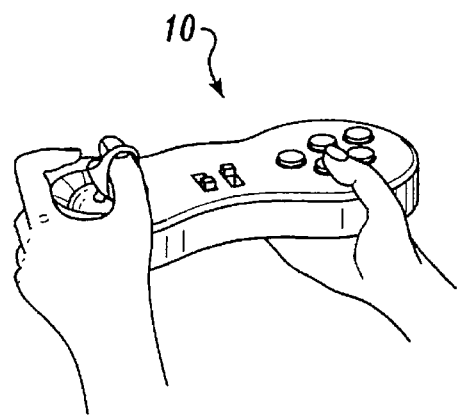
FIG. 2A is a schematic perspective view of the input device being held by a user.
Figure 2:
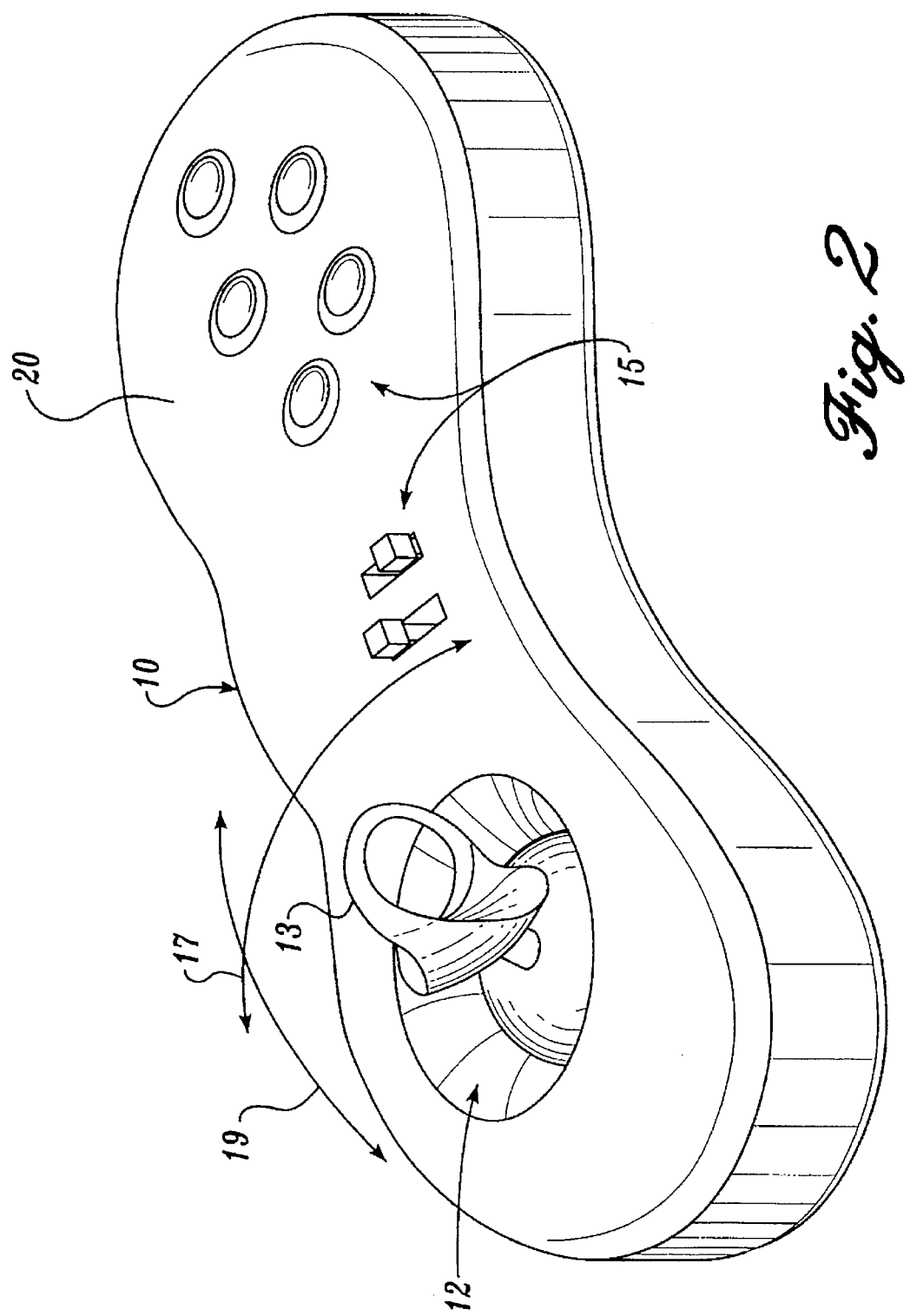
FIG. 2 is a schematic perspective view of the input device depicting the digital cradle of the force feedback apparatus.

With reference now to FIG. 2, the input device 10 supports the digit cradle 13 for two degrees-of-freedom of motion with respect to the input device 10, shown generally by arrows 17, 19. The input device 10 includes a housing 20 which is sized and configured to be grasped comfortably in at least one hand of a user as shown in FIG. 2A. Shown here is a digit cradle 13 positioned and configured to accept a thumb of a user, although other embodiments are contemplated, including those configured to accept an index or other finger of a user.

With reference now to FIGS. 3 and 4, a portion of the input device 10 is shown without its housing 20. Moveable structure 12 includes electric motors 30 and 32 along with angular position sensors 34 and 36 attached to respective shafts thereof. The motors 30 and 32 include shafts with capstans 38 and 40 disposed thereon, respectively. Sensor 34 responds to the angular orientation of capstan 38 and sensor 36 responds to the angular orientation of capstan 40 to generate signals for use by the programmable unit 14. A cable transmission mechanism 23 driven by the capstan 38 is adapted to rotate a shaft 21 about an axis 42, that is, left and right in FIG. 3. Similarly, capstan 40 is adapted to rotate the shaft 21 about an axis 44 so that it moves into and out of the plane of FIG. 3. As shown in FIG. 4, a drum sector 46 cooperates with capstan 38 and cable 23 to effect movement of shaft 21 along a first degree-of-freedom. This transmission system has low backlash and low friction. The sensors 34 and 36 provide an output proportional to angular orientation of the respective motor 30 and 32 shafts. Disposed at a distal end of shaft 21 is digit cradle 13.

As shown in FIG. 1, the input device 10 is connected to the computer 16 so that information and control signals can pass in either direction between the input device 10 and the computer 16. The programmable unit 14 may be included in the input device housing 20 or may be part of the computer 16 itself. The programmable unit 14 processes signals from the computer 16 using internally stored rules and equations to generate signals to drive the motors 30 and 32 so as to produce forces along the two degrees-of-freedom to the digital cradle 13 and to a user (not shown) having a digit disposed therein. The applied forces are based on internal programming within the programmable unit 14, events occurring in the simulation and movements of and forces applied to the digital cradle 13 by an operator (not shown). The advantageous use of the input device 10 in a system of this type therefore provides continuous interaction among motion of the digital cradle 13, events in the simulation and the forces applied to and applied by the cradle 13.

With reference now to FIGS. 5, 6, 7 and 8, an exemplary embodiment of a low profile moveable structure 112 is described. A motor 50 rotates a shaft 54 through a linkage denoted generally at 52. The shaft 54 passes through an angular orientation sensor such as potentiometer or encoder 56. The shaft 54 causes a bracket 58 to move left and right in FIG. 6 and engages a lower portion 59 of shaft 121 to cause a digit cradle 113 to pivot left and right in FIG. 5. The slotted bracket 58 is supported in bearings 60 and 61.

Similarly, a motor 62 drives a linkage 64 which rotates a shaft 68 which passes through a potentiometer or encoder 70. The shaft 68 causes a bracket 72 to rotate, causing the digital cradle 113 to move into and out of the plane of FIG. 5. The bracket 72 is supported by bearings 73 and 74.

Figure 5:
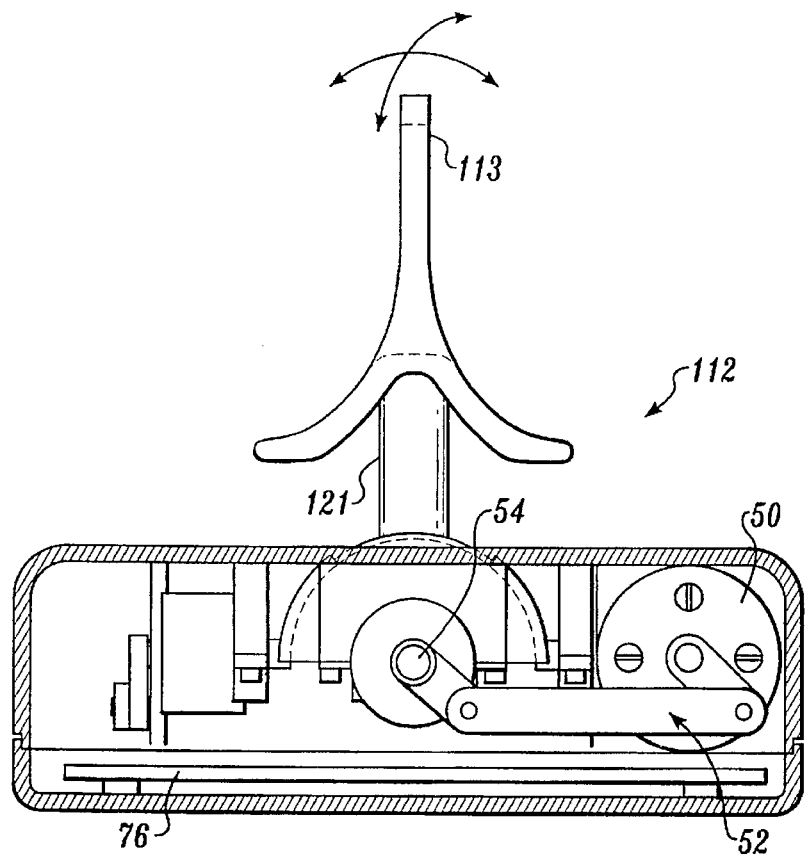
FIG. 5 is a schematic, cross-sectional side view of a preferred embodiment of the force feed apparatus of the present invention.

As will be appreciated, as the motors 50 and 62 are energized, the cradle 113 is driven with two degrees-of-freedom, that is, left and right and in and out of the plane of FIG. 5. The rotational sensors 56 and 70 provide electrical outputs proportional to the angular orientation of their respective shafts 54, 68. With reference to FIG. 5, the programmable unit 14 is shown as a circuit board 76 which may include motor control and signal processing electronics. In an exemplary embodiment, currents in the drive motors 50, 62 can be used to determine torque which can also be inferred from strain gauges or other types of force/torque sensors (not shown) on drive transmission components such as cables or shafts.

Figure 6:
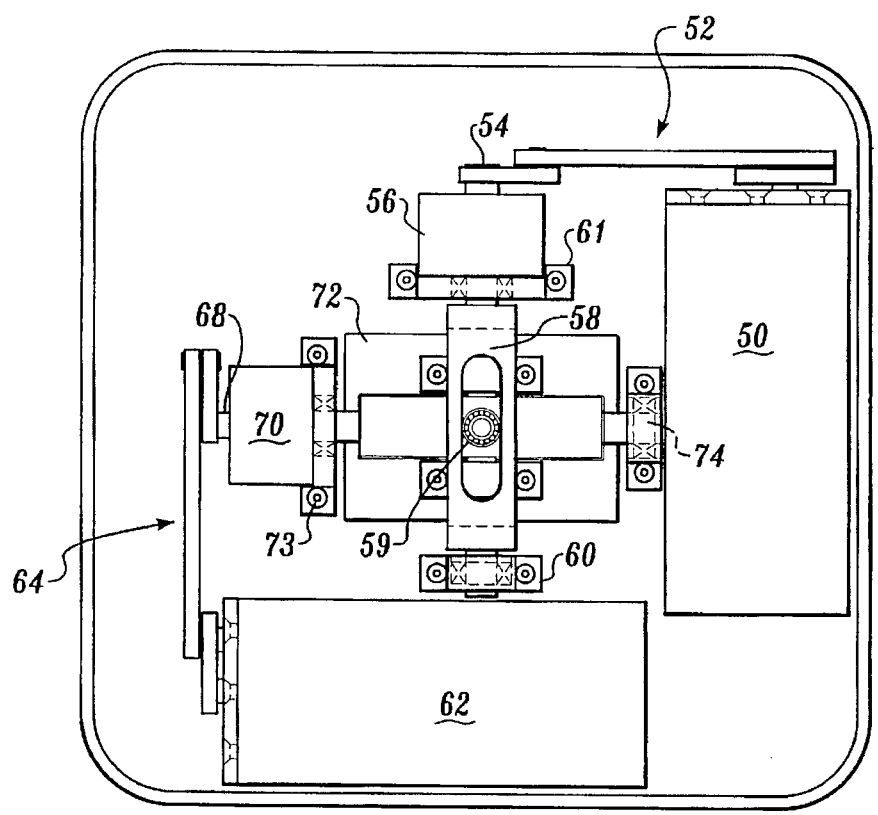
FIG. 6 is a schematic bottom view of the embodiment of FIG. 5.
Figure 7:
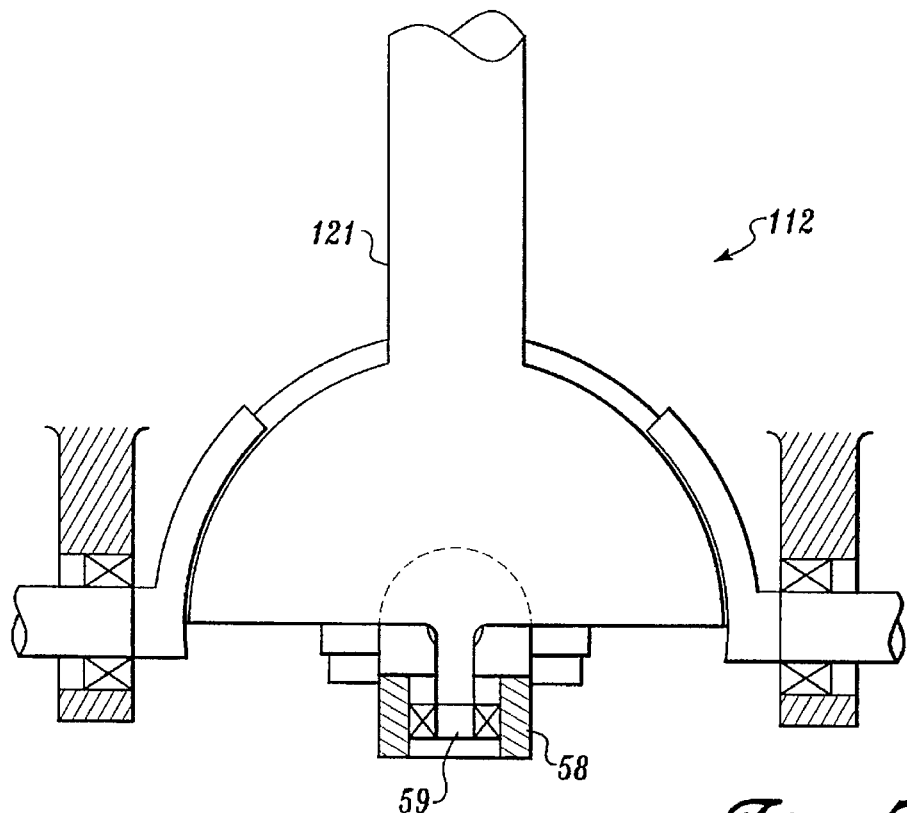
FIG. 7 is a detail taken from FIG. 5.
Figure 8:
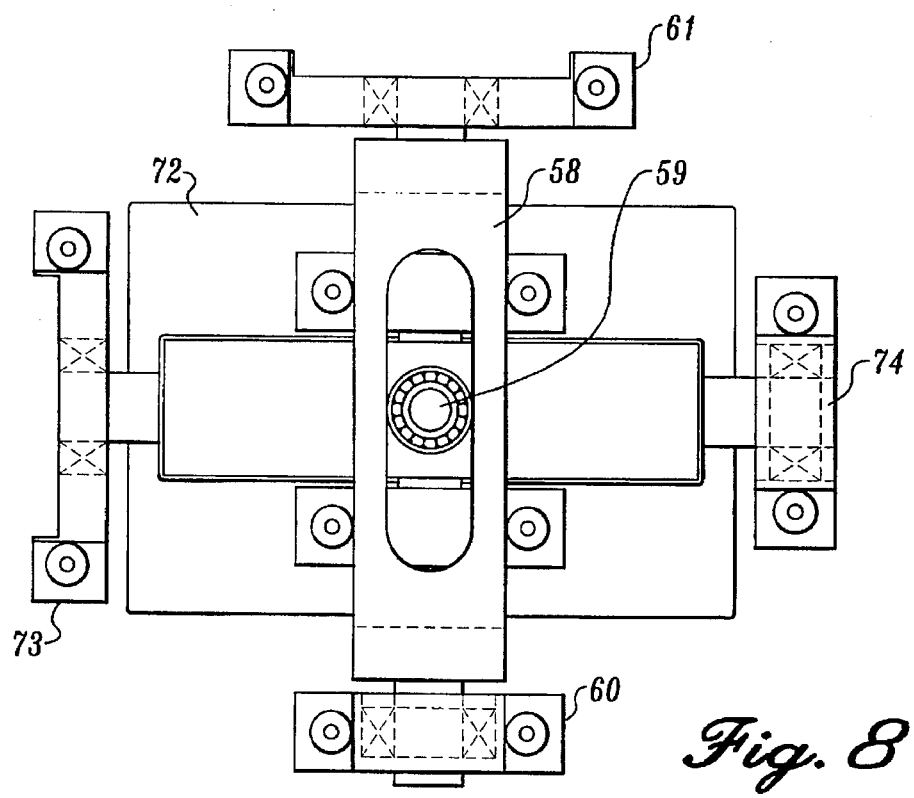
FIG. 8 is a detail taken from FIG. 6.
Figure 9:
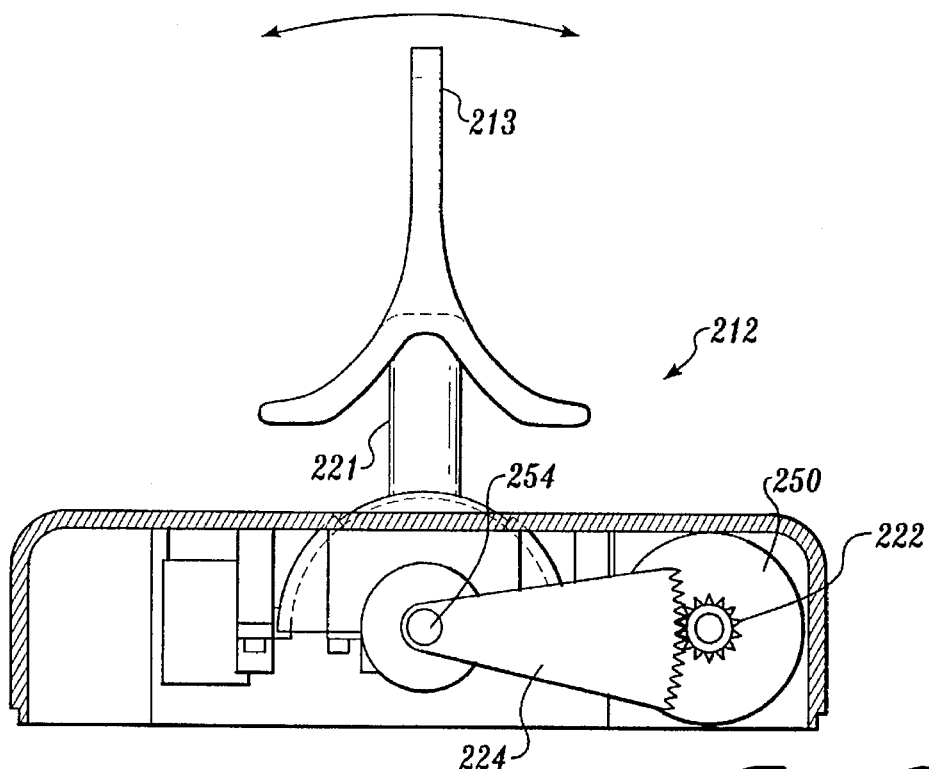
FIG. 9 is a schematic cross-sectional view of an alternate embodiment of the force feedback apparatus.
Figure 10:
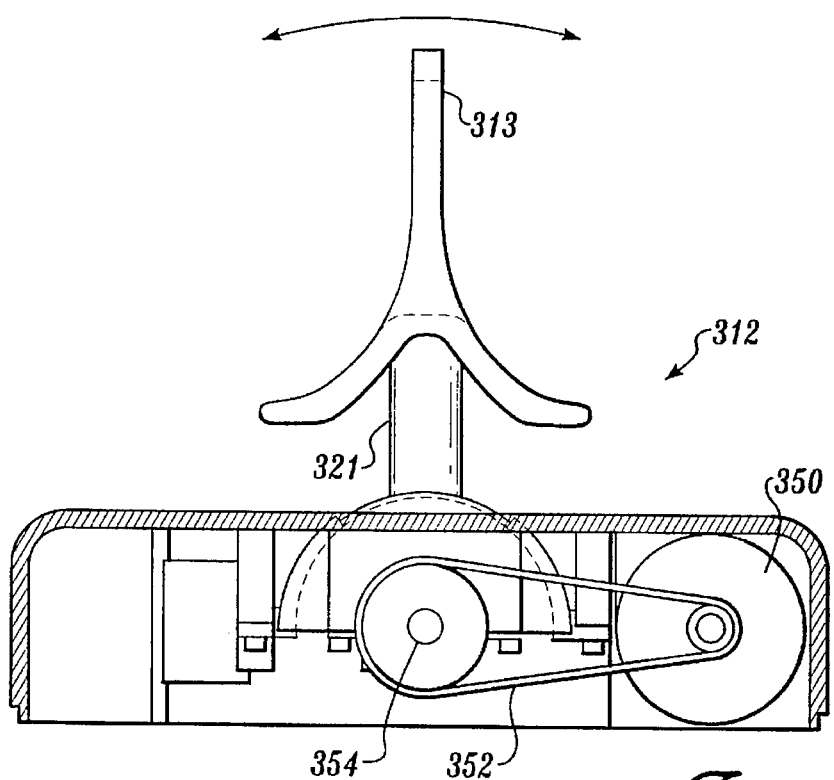
FIG. 10 is a schematic cross-sectional view of yet another alternate embodiment of the force feedback apparatus.

Depending on the requirements of a particular application, force transmission can be afforded by a mechanical linkage assembly such as the four-bar linkages 52, 64 illustrated in FIGS. 5 and 6, the cable trammission 23 illustrated in FIGS. 3 and 4 or other suitable means. For example, moveable structure 212 depicted in FIG. 9 shows digit cradle 213 disposed on a distal end of shalt 221. Pinion gear 222 mounted on a shaft of motor 250 engages sector gear 224 at a peripheral portion thereof to cause rotation of shaft 254 and concomitant rocking of shaft 221 and cradle 213 from left to right, as depicted in FIG. 9. The gear drive arrangement of FIG. 9 may be modified to a belt drive arrangement as shown in moveable structure 312 depicted in FIG. 10. In an exemplary embodiment, a toothed timing belt or band 352 transmits rotation of a shaft of motor 350 to shaft 354 causing rotation thereof, resulting in rocking of shaft 321 and cradle 313 from left to right, as depicted in FIG. 10. While FIGS. 9 and 10 show alternate embodiment trammissions acting in one degree-of-freedom only for clarity, similar transmission elements may be advantageously utilized to cause cradle motion into and out of the plane of the figures. If desired for a particular application, speed reduction or torque amplification can be built into the transmission of any embodiment depicted to amplify the force applied to the cradle 13 as desired, for example by changing gear ratios, belt pulley sizes or linkage lengths. In applications where space and motor size are not constrained, the motors 50 and 62 can be directly mounted onto shafts 54 and 68 in FIG. 6 without transmissions.

Figure 11A:
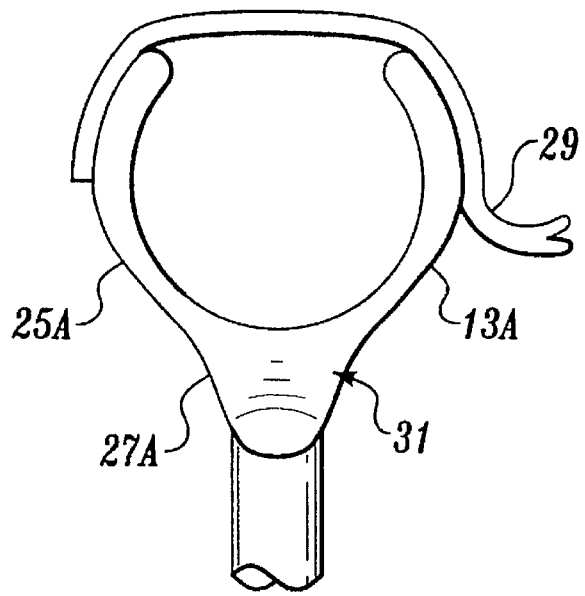
FIG. 11A is a schematic view of alternate and additional features of the digital cradle according to the invention.
Figure 11B:
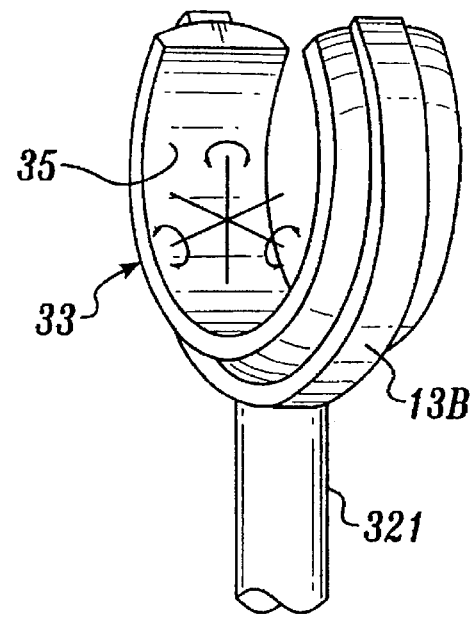
FIG. 11B is a schematic perspective view of yet another feature of the digital cradle according to the invention.

As discussed above, in the exemplary embodiment depicted in FIG. 2A, digit cradle 13 is positioned and configured to accept a thumb of a user. Referring to FIGS. 3 and 4, cradle 13 is depicted as a closed annulus 25 having an optional saddle portion 27 extending therefrom to comfortably support a digit of a user. As can be appreciated by those having skill in the art, a variety of alternate configurations may be employed to adapt the cradle 13 to a digit of a user thereby facilitating the practice of the innovative teachings disclosed herein. For example, FIG. 11A depicts digit cradle 13A having an interrupted or open annulus 25A. Cradle 13A may be manufactured of a compliant material, such as a polymer or thin sheet metal, such that positioning of a digit therein causes elastic deformation of the annulus 25A and maintenance of intimate contact with the digit. Additionally or alternatively, an adjustable strap 29 having hook and loop or other means for attachment and adjustment could be utilized to ensure positive securement of a digit in the cradle 13A. Other features such as raised ridges 31 may be formed within the annulus 25A or on saddle portion 27A, as shown, to reduce slippage. Additionally, as shown in FIG. 11B, a passive ball joint 33 having spherically contoured sleeve 35 may be disposed within a spherically contoured cradle 13B, depicted here as an open annulus type, to accommodate digital kinematics inconsistent with motion of shaft 321, for example, along predetermined axes of motion. Relative movement between a digit disposed in sleeve 35 and cradle 13B affords passive freedom of motion in three directions, specifically pitch, roll and yaw, as is shown and conventionally known for joints of this type.

Figure 12:
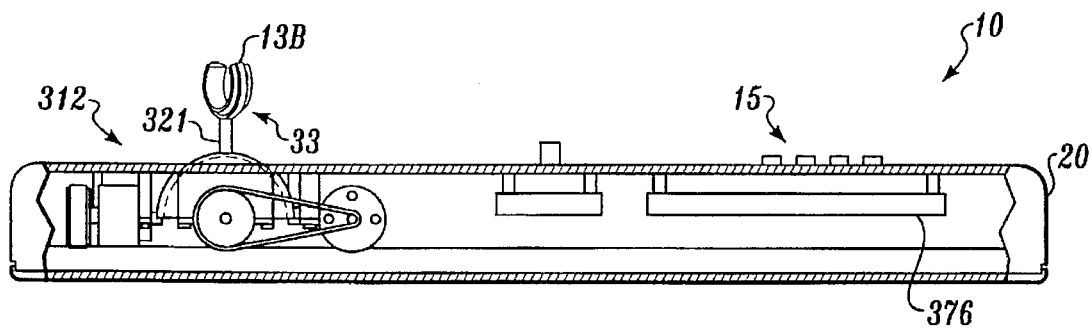
FIG. 12 is a complete schematic cross-sectional side view of an embodiment of the invention.
Figure 12A:
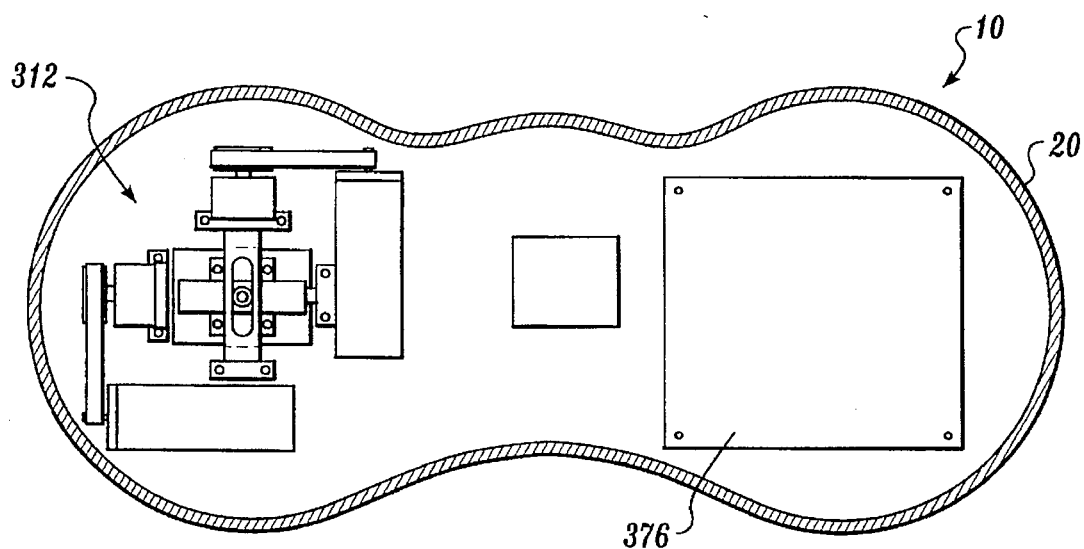
FIG. 12A is a schematic bottom view of the embodiment of FIG. 12.

FIGS. 12 and 12A depict complete side and bottom sectional views of a preferred belt drive embodiment of the input device 10. Cradle 13B including passive ball joint 33 is disposed at distal end of shaft 321 and actuated by moveable structure 312, substantially as depicted and described in FIG. 10. In order to maintain a low profile or overall height of device 10, circuit board 376 is located below a series of input switches 15 rather than beneath moveable structure 312. Arranged in this manner, the cradle 13B and switches 15 are advantageously positioned for simultaneous input by discrete digits of a user.

Typical parameters which may be accommodated in the various embodiments shown include actuated motion range of the cradle of about 45 degrees in each degree-of-freedom direction, actuation forces at the cradle of up to about one pound force peak and up to about 0.3 pound force continuous, and drive motor encoder shaft angular resolution of about 0.1 degrees. Input device 10 may be configured as shown in FIG. 2A, having overall dimensions and weight suitable for continuous grasping and manipulation by a user, for example, dimensions of about four inches by six inches by two inches and weight of about one pound.

While there have been described herein what are considered to be exemplary and preferred embodiments of the present invention, other modifications of the invention will be apparent to those skilled in the art from the teaching herein. For example, depending on the requirements of a particular application, the moveable structure may have two non-orthogonal degrees-of-freedom of motion or more than two degrees-of-freedom of motion. Further, a single motor may be employed with suitable transmission means to provide force to the cradle along more than one degree-of-freedom. Yet further, the input device may have more than one moveable structure disposed thereon, multiple devices being configured and positioned to accommodate multiple digits on a single hand of a user or one or more digits on both hands of a user simultaneously. It is therefore desired to be secured in the appended claims all such modifications as fall within the true spirit and scope of the invention. Accordingly, what is desired to be secured by Letters Patent of the United States is the invention as defined and differentiated in the following claims.

What is claimed is:

1. An input device including digital force feedback apparatus, for use in one of a video gaming and a virtual reality environment, comprising:

a housing having a size sufficiently small to be supported by one hand of an operator;

a moveable structure having at least two degrees-of-freedom of motion attached to said housing and comprising at least one cradle that is moveable by a digit of an operator; and at least one actuator disposed in said housing, said at least one actuator being attached to said moveable structure to provide force feedback to a digit of an operator disposed in said cradle along at least two degrees-of-freedom.

2. The invention according to claim 1 wherein:

said actuator comprises a motor for generating a torque about an axis of rotation of a shaft thereof.

3. The invention according to claim 2 further comprising:

means for determining angular position of said motor shaft.

4. The invention according to claim 1 wherein said actuator includes at least one cable drive.

5. The invention according to claim 1 wherein said actuator includes a mechanical linkage.

6. The invention according to claim 1 wherein said actuator includes a belt drive.

7. The invention according to claim 1 wherein said actuator includes a gear drive.

8. The invention according to claim 1 wherein said cradle is configured and positioned on said housing to conform to a thumb of a user.

9. The invention according to claim 1 wherein said cradle is comprised of a closed annulus.

10. The invention according to claim 9 wherein said cradle further comprises a saddle portion extending therefrom.

11. The invention according to claim 1 wherein said cradle is comprised of an open annulus.

12. The invention according to claim 11 wherein said cradle further comprises an adjustable strap spanning an opening formed by said open annulus.

13. The invention according to claim 12 wherein said cradle further comprises a saddle portion extending therefrom.

14. The invention according to claim 1 wherein said cradle is comprised of a passive ball joint.

* * * * *